United States Patent Office 3,551,347
Patented Dec. 29, 1970

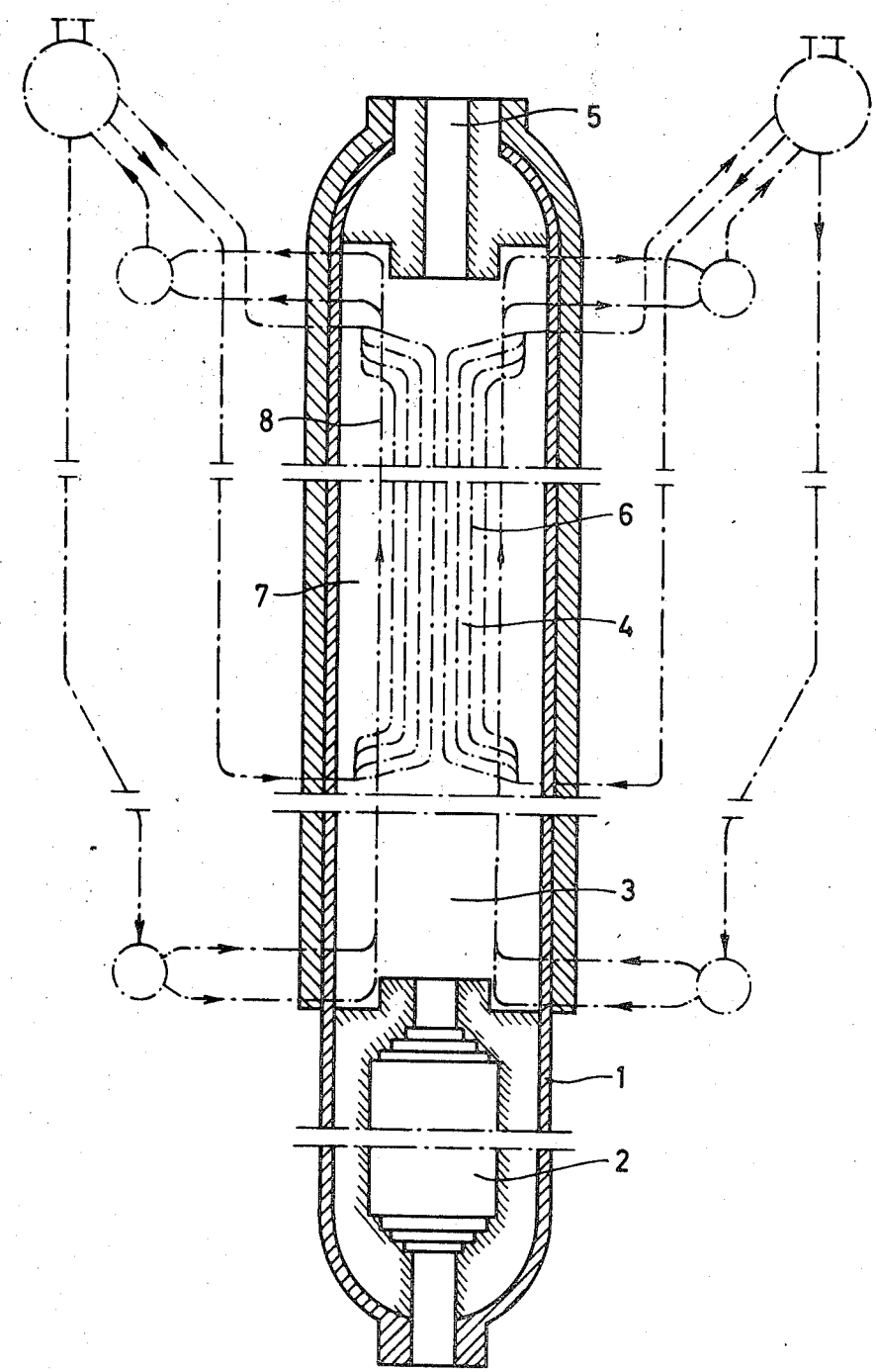

---

3,551,347
OXIDATION PROCESS WITH IMPROVED WASTE HEAT BOILER
Ferdinand Markert, Limburgerhof, Pfalz, and Michael Schunck and Georg Weber, Ludwigshafen (Rhine), Germany, assignors to Texaco Development Corporation, New York, N.Y.
Filed Aug. 24, 1967, Ser. No. 662,955
Claims priority, application Germany, Sept. 5, 1966, B 88,777
Int. Cl. C01b 2/14
U.S. Cl. 252—373                    7 Claims

ABSTRACT OF THE DISCLOSURE

A gaseous mixture comprising hydrogen and oxygen is produced by the partial oxidation of a hydrocarbon fuel in an elongated pressure vessel at an autogenous temperature of 1200 to 1500° C. The hot product gas is passed through a two-step cooling zone containing water cooled thin-walled tubes and then through an exit zone in succession in the same pressure vessel. Water is introduced into the bottom of a cooling wall comprising a plurality of thin-walled tubes running lengthwise through said two-step cooling zone and forming with the wall of said pressure vessel an annular space free from solid insulation through which substantially no gas flows, thereby controlling the temperature of the wall of the pressure vessel. A collection and distribution system separated from the hot product gases is provided for collecting and separating the steam and water departing from said two-step cooling zone and then recycling the water to said two-step cooling zone.

---

This invention concerns a process for the production of a gas mixture containing carbon monoxide and hydrogen by partial combustion of hydrocarbons, if necessary with the addition of steam, whereby the partial combustion takes place at higher pressures, particularly between 25 atmos. (368 p.s.i.) and 150 atmos. (2205 p.s.i.). The effluent heat of the gas mixture is used for producing high-pressure steam.

It is known that hydrocarbons can be transformed, by reaction with free oxygen, if necessary with the addition of steam, into carbon monoxide and hydrogen. In this autothermal cracking, temperatures from 1200° C. (2192° F.) to 1500° C. (2732° F.) are necessary.

The hot gases produced by the reaction should be cooled before further treatment. It is suitable to use their heat content for evaporation of water. When this is done for production of steam by indirect heat exchange, it is customary to use coolers equipped with gas tubes, whereby the product gas mixture flows through the tubes and the water flows outside the tubes.

In these coolers the gas is distributed to the individual gas tubes by chambers which have flat or cylindrical walls. Ordinarily, the chambers and the gas tubes are placed under the water level in a pressure vessel which is partly filled with water and wherein the evaporation of water takes place, as is described in German Pat. 1,074,545.

This arrangement has the effect that in all the gas tubes which have parallel flow, equal velocities can be maintained, and by this means good heat transfer from the gas to the tubes results and the deposit of soot on the tube walls is reduced.

For economy reasons it is advantageous to use as the fuel for the partial-oxidation process for carbon-monoxide and hydrogen production a cheap sulfur-containing heavy fuel oil. In this event, the gas produced contains a substantial quantity of hydrogen sulfide which attacks the material of construction of the chambers and gas tubes increasingly as the temperature is increased causing the formation of iron sulfide.

To avoid this corrosion or to maintain it within tolerable limits, the temperatures of the chamber walls and the tube walls exposed to the gas must not exceed a certain level. This requirement limits the application of gas tube coolers.

The temperature level of the wall on the gas side results from the temperature of the steam produced plus the temperature difference resulting from heat transfer through the walls of the tubes and the chambers by a given heat load. This temperature difference is determined by the thickness of the wall and the heat transfer of the material.

When the gas pressure and the gas quantity is increased the wall thickness of the gas chambers must also be increased. With a higher gas pressure the heat load is increased and it is particularly high at the entrance of the gas pipe coming from the chambers. Therefore, the highest temperature difference by heat transfer through the walls, occurs at these locations.

The limits of the application of the prior art coolers are therefore at gas quantities of 30,000 Nm$^3$/h. (1,060,000 cubic feet/hour), at gas pressures at approximately 45 atmos. (660 p.s.i.) and at steam pressures which are only a little higher. At the hottest areas of the gas coolers temperatures are nearly 400° C. (750° F.).

If the gas produced by partial oxidation must be compressed for subsequent treatment, for instance, ammonia synthesis, it is especially economical to run the gas production at a higher pressure level, for example 80 atmos. 1170 (p.s.i.) to 120 atmos. (1760 p.s.i.), since the total required compression work will be lower when the pressure of the exit gas from the waste-heat boiler is higher. Also, the pressure of the steam should be as high a pressure as possible because of the resulting higher energy yield.

If the steam produced is to be used in the same partial oxidation, the pressure of the steam must be higher than the pressure of the gas produced.

It is therefore an object of this invention to provide a process and apparatus which does not have the aforementioned disadvantages and which permits the partial oxidation to be carried out at high pressures and at the same time produces high-pressure steam.

It was found that partial oxidation under pressure of gaseous or liquid hydrocarbons, if necessary with addition of steam, for production of gases containing carbon monoxide and hydrogen and by cooling the gas mixture, production of high-pressure steam can be carried out if for the cooling of the gas mixture and for the steam production a cooler is used which is equipped with thin-walled tubes which are heated outside and through which water or steam/water mixture flows. The thick wall collector and distributor for the water and the water/steam mixture produced are not exposed to direct heat by the gas mixture: therefore, their wall temperature does not exceed the temperature of the heated thin wall tubes.

As gaseous or liquid hydrocarbon feed, methane, natural gas, LPG, gasoline, gas oil and by advantage crude oil and particularly sulfur-containing heavy oils, such as heavy fuel oils may be used.

The process corresponding to this invention is particularly suitable at gas pressures above 40 atmos. (590 p.s.i.) and steam pressures above 64 atmos. (940 p.s.i.) The preferred application consists of using heavy fuel oil as feed stock and carrying out the partial oxidation at pressures above 70 atmos. (1030 p.s.i.) and producing saturated steam at a pressure higher than the gas pressure.

To further reduce the heat load on the heat transfer surface a more improved design of cooler is used in which the hot gas gives up, first, part of its heat to the boiler tubes located in the radiation zone, and then the gas with reduced reaction temperature passes into the convection zone likewise equipped with boiler tubes.

To eliminate the use of connecting ducts, it is moreover advantageous to place in a common pressure vessel, directly connected to each other, the steam-producing gas cooler and the reactor for the partial oxidation. By this means, the pressure in the gas cooler may be substantially the same as the superatmospheric pressure in the reactor.

For the process corresponding to the invention a design is also used for the cooler in which the walls of the vessel bearing the gas pressure are protected against the action of the hot gases by cooling surfaces placed in front of the vessel walls to prevent the temperature of the vessel wall exceeding that of the saturated steam produced.

In the accompanying drawing a unit is shown for the partial oxidation of hydrocarbons together with a gas cooler. In the pressure shell 1 are arranged the reaction chamber 2, the radiation cooler part 3 and the convection cooler part 4. The gas coming from the reaction chamber 2 at a temperature of 1400° C. (2552° F.) is cooled down by passage through the radiation cooler 3 by about 300° C.–400° C. (540° F.–720° F.) and enters the convection part 4 at a temperature between 1000° C.–1100° C. (1832° F.–2012° F.). In the latter (convection part of the cooler), it is further cooled to 400° C.–500° C. (752° F.–932° F.) and the gas leaves the cooler through the exit 5. The tubes 8 in the convection and radiation parts are equipped with fins which are welded together to make them gas-tight. This has the effect that the pressure shell 1 can reach, at the highest, the temperature of the saturated steam, since in the space 7 between the gas-tight fin wall 8 and the pressure vessel 1 no gas flow is foreseen. The space 7 has a pressure equalization with the space on the other side of fin wall 8. The steam collector and the downcomer tubes for the water to be evaporated are situated, in the example, outside the pressure-supporting wall, so that the maximum wall thickness of the heated surfaces is the wall thickness of the tubes and is nearly about 4 mms. (approximately 0.158").

At a gas pressure of 80 atmos. (1175 p.s.i.), the temperature of the tubes is about 30–50° C. (54–90° F.) higher than the temperature of the saturated steam, according to the heat load; so when the pressure of the saturated steam is 100 atmos. (1470 p.s.i.), corresponding to a temperature of saturated steam of 310° C. (590° F.), the wall temperature of the heated tubes is 340° C. (644° F.) to 360° C. (680° F.).

We claim:

1. A process for the production of a gas mixture comprising carbon monoxide and hydrogen and recovering the sensible heat by the production of steam comprising: introducing oxygen and a hydrocarbon fuel as feed materials into the lower extremity of an elongated pressure vessel comprising a reaction zone, a two-step cooling zone containing water cooled thin-walled tubes, and an exit zone arranged in succession; reacting said feed materials by partial oxidation at an autogenous temperature in the range of about 1200° C. to 1500° C.; passing the effluent gas mixture from said reaction zone directly into said two-step cooling zone comprising in succession a radiation section and a convection section, with a gas-tight cooling wall extending longitudinally through said two-step cooling zone and forming with the wall of said pressure vessel an annular space free from solid insulation and through which substantially no gas flows, and cooling said effluent gas mixture by indirect heat exchange with water first in said radiation section and then in said convection section; introducing the cooled effluent gas mixture from said two-step cooling zone directly into said exit zone in the upper region of said pressure vessel; removing a mixture of steam and water from said two-step cooling zone and introducing the last mentioned mixture into an external collection zone where said water is separated from said steam; and introducing the separated water into an external distribution zone for recycling said separated water to said two-step cooling zone for indirect heat exchange with said effluent gas.

2. A process according to claim 1 wherein said reaction zone and said cooling zone are at substantially the same internal superatmospheric pressure, and whereby the external pressure on the external collection and distribution zones is atmospheric.

3. A process for the production of a gas mixture comprising carbon monoxide and hydrogen and recovering the sensible heat by the production of steam comprising: introducing oxygen and hydrocarbon fuel as feed materials into the lower extremity of an elongated pressure vessel comprising a reaction zone, a two-step cooling zone containing water cooled thin-walled tubes, and an exit zone arranged in succession; reacting said feed materials by partial oxidation at an autogenous temperature in the range of about 1200° C. to 1500° C.; passing the effluent gas mixture from said reaction zone directly into said two-step cooling zone comprising in succession a radiation section and a convection section, with a gas-tight cooling wall comprising a plurality of thin-walled tubes extending longitudinally through said two-step cooling zone and forming with the wall of said pressure vessel an annular space free from solid insulation and through which substantially no gas flows, and cooling said effluent gas mixture by indirect heat exchange with water first in said radiation section and then in said convection section, introducing water into the bottom of said cooling wall and removing a mixture of water and steam from the top of said cooling wall so that the temperature of the wall of said pressure vessel does not exceed the temperature of the saturated steam produced in said cooling wall of thin-walled tubes; introducing a mixture of water and steam from said two-step cooling zone into a collection and distribution zone separated from said effluent gas, separating said water from said steam in said collection and distribution zone and recycling said water to said two-step cooling zone for indirect heat exchange with said effluent gas; and introducing the cooled effluent gas mixture from said two-step cooling zone directly into said exit zone.

4. A process according to claim 3 wherein said effluent gas mixture is cooled in said radiation section to a temperature in the range of about 1000° C. and is then cooled in said convection section to a temperature in the range of about 400° C. to 500° C.

5. A process according to claim 3 with the added step of introducing a portion of the steam separated from water in said collection zone into said reaction zone.

6. Apparatus for the production of a gas mixture to comprise carbon monoxide and hydrogen by the partial oxidation of hydrocarbon fuels at elevated pressure comprising in combination an elongated pressure resistant shell containing successively connected and in axial alignment a reaction chamber, a cooling chamber comprising a radiation section and a convection section and an exit section for discharging the product gas; a gas-tight wall of water cooled thin-walled tubes running lengthwise through said cooling chamber and providing an annular space with said shell through which substantially no gas flows; a plurality of water cooled thin-walled tubes running lengthwise through said convection section; and thick-walled collecting and distributing means located externally of said pressure shell for collecting water and steam from the upper extremities of said plurality of said thin-walled tubes in said cooling chamber and for separating water from the steam and for returning this separated water to the lower extremities of said thin-walled tubes.

7. An apparatus according to claim 6 wherein said thin-walled tubes in said cooling chamber comprise a plurality of finned type tubes.

References Cited

UNITED STATES PATENTS

| | | | |
|---|---|---|---|
| 2,594,329 | 4/1952 | Mayhew | 48—196 |
| 2,601,001 | 6/1952 | Patterson | 48—196 |
| 2,603,559 | 7/1952 | Patterson | 48—196 |
| 2,840,049 | 6/1958 | Durham | 122—333 |

JOSEPH SCOVRONEK, Primary Examiner

U.S. Cl. X.R.

23—277; 48—107, 196, 212, 215; 122—333